US012188745B1

(12) United States Patent
Salazar et al.

(10) Patent No.: US 12,188,745 B1
(45) Date of Patent: Jan. 7, 2025

(54) WEAPON DIFFERENTIATION NOTIFICATION SYSTEM

(71) Applicant: Zyno Engineering, LLC, Belle Center, OH (US)

(72) Inventors: Brandon Salazar, Melbourne, FL (US); Daniel J. Keys, Belle Center, OH (US); Allison Davidoff, Melbourne, FL (US)

(73) Assignee: Zyno Engineering, LLC, Belle Center, OH (US)

( * ) Notice: Subject to any disclaimer, the term of this patent is extended or adjusted under 35 U.S.C. 154(b) by 140 days.

(21) Appl. No.: 18/108,510

(22) Filed: Feb. 10, 2023

Related U.S. Application Data

(60) Provisional application No. 63/309,501, filed on Feb. 11, 2022.

(51) Int. Cl.
*F41C 33/02* (2006.01)
*G08B 7/06* (2006.01)

(52) U.S. Cl.
CPC ........ *F41C 33/029* (2013.01); *F41C 33/0209* (2013.01); *G08B 7/06* (2013.01)

(58) Field of Classification Search
CPC .. F41C 33/029; F41C 33/0209; G08B 25/016; G08B 25/004
See application file for complete search history.

(56) References Cited

U.S. PATENT DOCUMENTS 5,479,149 A 12/1995 Pike
6,886,725 B2 5/2005 Lowe et al.
7,140,523 B2 11/2006 Lowe et al.
7,353,632 B2 4/2008 Newkirk et al.
9,666,056 B2 5/2017 Herrera et al.
9,829,275 B2 11/2017 Madrid et al.
10,775,132 B2 * 9/2020 Tedder .................... H04W 4/80
11,403,926 B2 * 8/2022 Siner, Jr. .......... G08B 13/19684
2001/0019071 A1 * 9/2001 Vor Keller ............ F41C 33/029 224/244
2001/0048009 A1 * 12/2001 Vor Keller .............. F41C 33/04 224/244
2002/0134803 A1 9/2002 Lowe et al.
2002/0158095 A1 * 10/2002 Vor Keller .............. F41A 23/18 224/244
2005/0035162 A1 2/2005 Lowe et al.
2007/0124979 A1 6/2007 Newkirk et al.

(Continued)

FOREIGN PATENT DOCUMENTS

WO 2017/117617 7/2017
WO WO-2022235833 A1 * 11/2022 .......... F41C 33/0209

*Primary Examiner* — Hoi C Lau
(74) *Attorney, Agent, or Firm* — Lang Patent Law LLC; William F. Lang, IV

(57) ABSTRACT

A holster includes a system for providing an audio and/or a visual notification differentiating a lethal weapon from a less lethal weapon when one of these weapons is removed from its holster. The holster includes a sensor for detecting the presence of a weapon therein as well as removal of the weapon. Upon receiving a signal from the sensor indicating drawing of the weapon, a microcontroller actuates a speaker and/or a visual display to indicate the type of weapon which was drawn. Others are made aware of the type of weapon being drawn or which is currently deployed. The wearer of the holster is also made aware of a mistake if the incorrect type of weapon is drawn.

6 Claims, 8 Drawing Sheets

(56) References Cited

U.S. PATENT DOCUMENTS

| | | | | |
|---|---|---|---|---|
| 2011/0252682 | A1* | 10/2011 | Delgado Acarreta | F41A 9/62 42/1.02 |
| 2014/0162584 | A1 | 6/2014 | Cope | |
| 2015/0369559 | A1 | 12/2015 | Del Rosario | |
| 2016/0086472 | A1 | 3/2016 | Herrera et al. | |
| 2016/0366327 | A1 | 12/2016 | Kusens | |
| 2016/0377373 | A1* | 12/2016 | Feldstein | F41C 33/029 42/1.01 |
| 2017/0003101 | A1 | 1/2017 | Madrid et al. | |
| 2017/0074617 | A1 | 3/2017 | Stewart et al. | |
| 2018/0100713 | A1* | 4/2018 | Patches | G08B 25/004 |
| 2019/0137215 | A1* | 5/2019 | Bernkrant | F41C 33/0263 |
| 2020/0217613 | A1* | 7/2020 | Hatcher | G08B 21/24 |
| 2024/0068772 | A1* | 2/2024 | Rye | F41C 33/029 |

* cited by examiner

WEAPON DIFFERENTIATION NOTIFICATION SYSTEM

CROSS REFERENCE TO RELATED APPLICATION

This application claims the benefit of U.S. provisional patent application Ser. No. 63/309,501, which was filed on Feb. 11, 2022, and entitled "System for a Holster with an Automatic Audible Indicator of a Weapon Being Drawn."

TECHNICAL FIELD

The present invention relates to a notification system for differentiating between lethal and less than lethal weapons as a weapon is being drawn from a holster. More specifically, the system provides an audible and/or visual indicator of the type of weapon being drawn and/or whether a lethal or less than lethal weapon has been drawn.

BACKGROUND INFORMATION

Many police officers currently carry both firearms and less-than-lethal weapons such as an EMD device (Electro-Muscular Disruption). Some EMDs are configured in a manner to feel similar to firearms, which has contributed to a many incidents of police officers intending to draw their EMDs, but instead drawing their firearm, using lethal force in a situation which called for less-than-lethal force or vice versa. This has resulted in hundreds of millions of dollars in wrongful death lawsuits against police departments, city, county, and state entities. Sometimes the officers themselves are killed instead of the perpetrator. To reduce the possibility of such mistakes, EMDs are often required to be carried on the weak side of the body, either for a weak hand draw, or in a cross-draw position. However, mistakes can and do still occur, and a way to reduce or eliminate such mistakes is desired.

It is also desirable to let other officers who may be present know what is occurring. For example, if one officer draws an EMD device, another officer is often required by policy to draw a firearm to cover the first officer, in case the EMD device fails to accomplish its purpose. Many police departments instruct their officers to verbally state that they are drawing an EMD device, for example, by yelling "TASER, TASER, TASER!" when drawing a popular EMD device sold under that trademark. However, such verbal signals do not communicate when a mistake has been made or is about to be made, where an officer intends to draw a less than lethal device but inadvertently draws a firearm. During adrenaline filled encounters where the difference between a life and death is measured in seconds or fractions of seconds, the need to know which officer is drawing which system is crucial. Despite the training of the officers, the unknown and ever-changing variable is the perpetrator, who can either deescalate or escalate with little or no advance warning, forcing the officers to switch tactics. This switching of tactics costs valuable time. Good situational awareness is always divided by the time available to make a good decision. Adrenaline can often have a negative impact on perception as well as clear rational thought processes, resulting in overreacting or under-reacting to a given situation. There is a desire to make available a device that can lend assistance to communicate the tactical read of a situation on the officer's side. This device would also be communicating to the perpetrator as to the level of force being deployed, as to enlist further cooperation, much like the psychological effect of racking a shotgun. It becomes a psychological motivator to comply with commands with the weapon wielding user.

Numerous holsters which detect the removal of a weapon therefrom have been proposed. Most of these holsters are intended to activate a camera, GPS location, additional officers, alerting dispatch or providing evidence upon removal of a weapon from a holster, and/or to transmit information to a remote location upon removal of the weapon, rather than to provide an audible and/or visual alert to others who are present, in conversational distance at the scene where the weapon is removed. Examples of such holsters are discussed below. The entire disclosure of each and every reference discussed below is expressly incorporated herein by reference.

U.S. Pat. No. 5,479,149, which was issued to G. D. Pike on Dec. 26, 1995, discloses a weapon monitoring and recording system. The system includes a manual switch as well as a sensor switch which is activated by removal of a weapon from a holster. Upon activation of the switch, all audible sounds and conversations are recorded and transmitted. The weapon also includes a sensing and signal transmitting device so that it can be located if it is lost or stolen. The receiver/transmitter/recorder unit is attached to the belt, separate from the holster.

U.S. Pat. No. 7,353,632, which was issued to R. H. Newkirk et al. on Apr. 8, 2008, discloses a gun with a notification system. The gun detects when it is removed from a holster, authenticates the user, and transmitting the information to a remote location. The system also has means for locking the trigger of the gun or activating a GPS system from the remote location. The gun may include a mercury switch, or the gun or holster may include a strain gauge potentiometer below a flexible membrane, or an electromagnetic switch to detect removal of the gun from the holster. The same holster is disclosed in US 2007/0124979, which was invented by R. H. Newkirk et al. and published on Jun. 7, 2007.

US 2002/0134803, which was invented by M. V. Lowe et al. and published on Sep. 26, 2002, discloses a security holster for a firearm. When the firearm is holstered, an audible indication of locking the gun in the holster is provided.

US 2005/0035162, which was invented by M. V. Lowe et al. and published on Feb. 17, 2005, discloses a security holster for use with a handgun. When the firearm is holstered, an audible indication of locking the gun in the holster is provided.

Us 2014/0162584, which was invented by S. Cope and published on Jun. 12, 2014, discloses a safety gun holster. The holster includes a sensor which is connected to a transmitter. The transmitter sends a message to a dispatch center and/or switches a police officer's radio to hands free mode. The sensor is an infrared sensor which detects an infrared signal from an infrared emitter. When the gun is in the holster, the infrared signal is interrupted. When the gun is drawn, the infrared signal is uninterrupted.

US 2015/0369559, which was invented by T. P. Del Rosario and published on Dec. 24, 2015, discloses a microcontroller system for attachment to a weapon holster. The system includes a Hall effect sensor having a permanent magnet on the side facing away from the interior of the holster. The presence of a weapon within the holster changes the magnetic flux density within the holster. A radio transmitter signals a video recording device worn separately from the holster to begin recording. Although the device is primarily intended for use with a handgun, it may be used with any weapon having ferromagnetic properties.

US 2016/0086472, which was invented by R. Herrera et al. and published on Mar. 24, 2016, discloses a system for detecting a firearm within a communication system. The system utilizes a body area network with a plurality of notes. A first node connects to a firearm. A second node connects to a holster. A third node connects to a portable radio. A fourth node may connect to a wearable camera. The first and second nodes detect the presence or absence of the gun from the holster. Upon removal of the firearm from the holster, the third node may communicate with the fourth node to activate the camera, as well as communicating with a remote location. The first node may detect touching of a capacitive sense plate on the gun through capacitive coupling, waking the first node. Removing the gun from the holster interrupts the capacitive coupling of the first and second nodes. A compass integrated circuit in the first node may permit monitoring the orientation of the gun.

US 2016/0366327, which was invented by M. Kusens and published on Dec. 15, 2016, discloses a system for activating body cameras when a law enforcement instrument is removed from its holster or pouch. The instrument can be a weapon, flashlight, handcuffs, nightstick, stun gun, pepper spray, etc. The sensor may be contact closures which are opened when a device is removed from a holster, pressure sensors, weight sensors, or magnetic sensors such as Hall effect sensors. Removal of a device triggers audio and video recording by a camera worn on the officer's body. A GPS may provide the officer's location. An alert can be sent to a remote location such as central dispatch.

US 2017/0003101, which was invented by J. F. Madrid et al. and published on Jan. 5, 2017, discloses a firearm monitoring and tracking system for detecting the absence or removal of a firearm from a holster. A proximity sensor such as a ferrous or optical proximity sensor is used to detect removal of the firearm. A geospatial positioning module provides the location at which the gun is removed. Firearm discharge data is collected using an accelerometer, which is described in FIG. 7 as being located on the holster. A microphone captures any audio in the vicinity of the system. A wireless communication module transmits the information to a monitoring party. The system is contained within a device sleeve which is located on the exterior of the holster.

US 2017/0074617, which was invented by R. J. Stewart et al. and published on Mar. 16, 2017, discloses a system for detection and tracking of holstering and unholstering. The presence or absence of a weapon in a holster is detected using a magnetic sensor, a radio frequency identification sensor, inductive coupling, photo interruption mechanism, dielectric shift (change in capacitance), differences in accelerometer measurements, a strain gauge, a pressure gauge, or biometric sensors to detect a hand on the weapon. The system may be connected wirelessly to a smart phone, smart watch, tablet, etc. to provide a user interface. Accelerometers may detect movement of the device or the user. Ambient light conditions, still images, or video may be collected. Information may be transmitted to a remote location, enabling a decision to send assistance to the officer who drew a weapon.

WO 2017/117617, which was invented by K. Bernkrant et al. and published on Jul. 6, 2017, discloses a smart weapon holster. The holster includes a retractable cover which, upon being retracted, transmits data to a remote location. The holster includes a locking mechanism which is intended for use when storing or transporting a firearm in the holster. The smart holster may be remotely locked and unlocked. Placing the weapon in the holster causes the weapon to depress a weapon present sensor button. Removing the weapon from the holster activates a camera. The holster includes a speaker and audio amplifier to produce sounds such as audible beeps to indicate that the holster has been commanded into a locked or unlocked state. A remote monitoring station may also activate a camera or microphone. An audible alarm may sound if the holster is moved into or out of a geofenced area. Geolocation information can be transmitted to the remote location. The holster may wirelessly communicate with a smart phone, tablet, or other device having smart holster software installed thereon. The holster may include a tamper alarm which may sound when accelerometers signal that the holster has been moved for a predetermined period of time.

Although the above-described references describe various systems which detect the removal of a weapon from a holster, none of these holsters provide an audible and/or visual alert of a weapon being drawn to other officers who may be present or the perpetrator. It would be desirable, for example, for an EMD device holster to automatically announce "TASER, TASER, TASER!" upon drawing a TASER/EMD sold under that trademark. Not only would other officers know that an EMD device has been drawn, but the officer intending to draw the EMD device will have an opportunity to realize a mistake has been made if they were to draw a lethal weapon as they would not hear, "TASER, TASER, TASER." As another example, it would be desirable for a holster for a firearm to announce "LETHAL, LETHAL, LETHAL!" upon drawing a firearm. An officer drawing a weapon and failing to hear the correct announcement, or hearing an incorrect announcement, will thus have an opportunity to realize that a mistake has possibly been made, and to correct the mistake before any harm results. Furthermore, other officers will be notified of whatever is occurring without the need for the officer drawing a weapon to concentrate on an additional task. It would additionally be desirable if the user could activate and deactivate the automatic notification depending on the officer's circumstances, such as surreptitious approaches or clearing structures, where an audible or visual notification could be a tactical disadvantage to the officer or officers.

SUMMARY

The above needs are met by a weapon differentiation notification system for a holster. The holster comprises a holster body. The holster body is structured to hold a weapon within the holster body. The weapon is of a type of weapon and has a level of force for which the weapon is used. The holster includes a control system. A sensor is disposed within or on the holster body. The sensor is operatively connected to the control system. An output device is operatively connected to the control system. The control system is structured to receive a signal from a sensor, and to determine whether the weapon is within the holster body based on the signal from the sensor. In the event that the signal from the sensor changes from an indication of the weapon being within the holster body to the weapon being absent from the holster body, the controller is structured to provide a signal to the output device, causing the output device to output a notification. The notification specifies either the level of force for which the weapon is used or the type of weapon being drawn from the holster.

The above needs are further met by a weapon differentiation notification system. The system comprises a first holster body which is structured to hold a first weapon within the first holster body. The first weapon is of a type of weapon and has a level of force for which the first weapon is used. The system further comprises a second holster body which is structured to hold a second weapon within the second holster body. The second weapon is of a type of weapon which is different from the first weapon and has a level of force for which the second weapon is used, and which is different from the first weapon. The system includes a control system. A first sensor is disposed within the first holster body. The first sensor is operatively connected to the control system. A second sensor is disposed within the second holster body. The second sensor is operatively connected to the control system. The system further comprises a first output device which is structured to provide an audible notification or a visual notification, and which is operatively connected to the control system. The control system is structured to receive a signal from the first sensor and to determine whether the first weapon is within the first holster body based on the signal from the first sensor. The control system is further structured to receive a signal from the second sensor and to determine whether the second weapon is within the second holster body based on the signal from the second sensor. The control system is further structured to, in the event that the signal from the first sensor changes from an indication of the first weapon being within the first holster body to the first weapon being absent from the first holster body, provide a signal to the first output device causing the first output device to output a first audible notification or a first visual notification specifying either the level of force for which the first weapon is used or the type of weapon corresponding to the first weapon. The control system is further structured to, in the event that the signal from the second sensor changes from an indication of the second weapon being within the second holster body to the second weapon being absent from the second holster body, provide a signal to the first output device causing the first output device to output a second audible notification or a second visual notification specifying either the level of force for which the second weapon is used or the type of weapon corresponding to the second weapon.

These and other aspects of the invention will become more apparent through the following description and drawings.

BRIEF DESCRIPTION OF THE DRAWINGS

Like reference characters denote like elements throughout the drawings.

DETAILED DESCRIPTION

Figure 1:
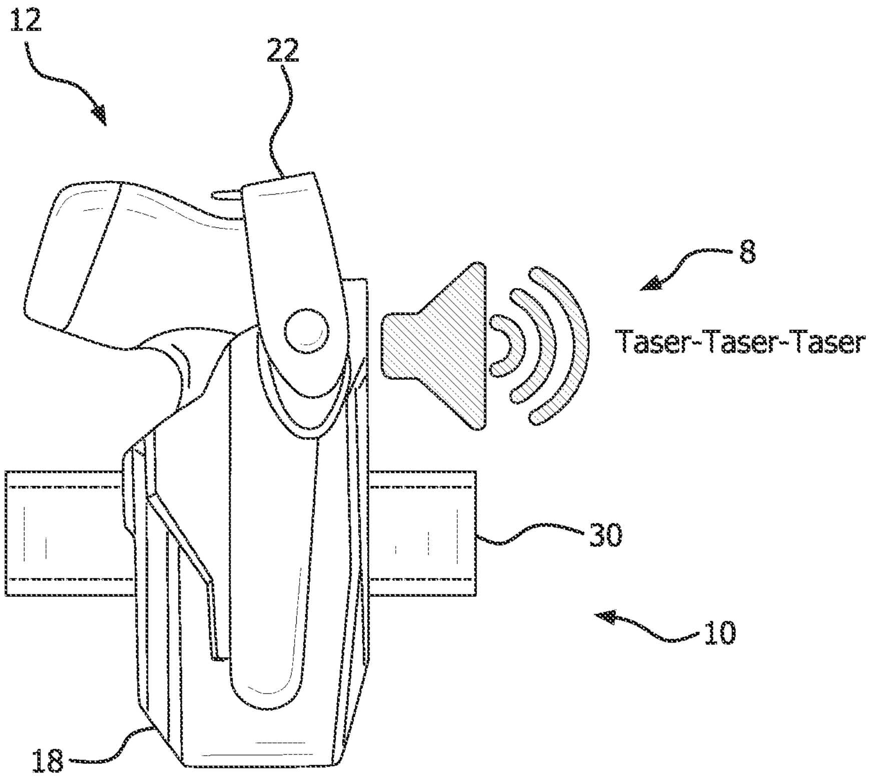
FIG. 1 is a side elevational view of an example of a holster of the present invention.
Figure 2:
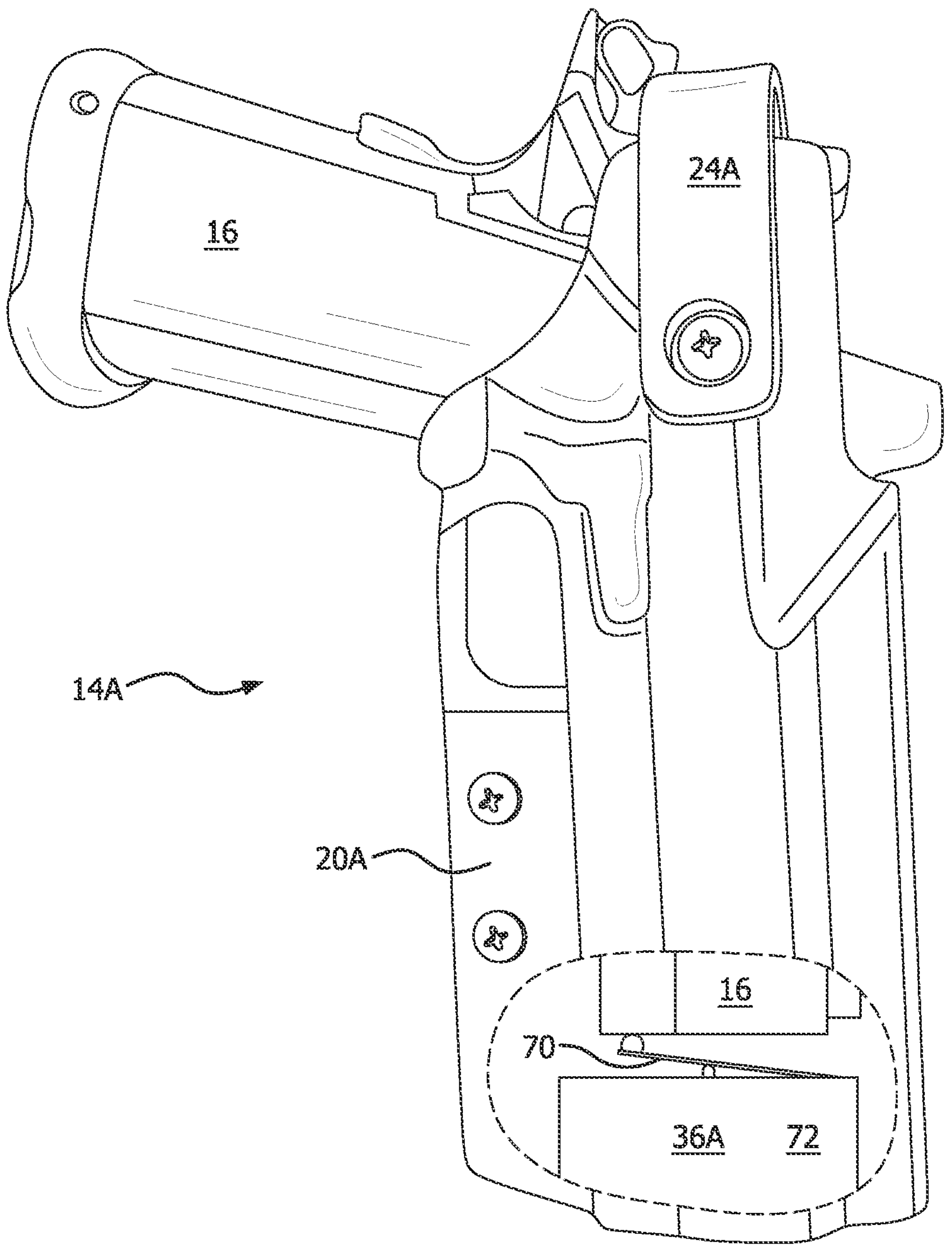
FIG. 2 is a partially cutaway side elevational view of another example of a holster of the present invention.
Figure 3:
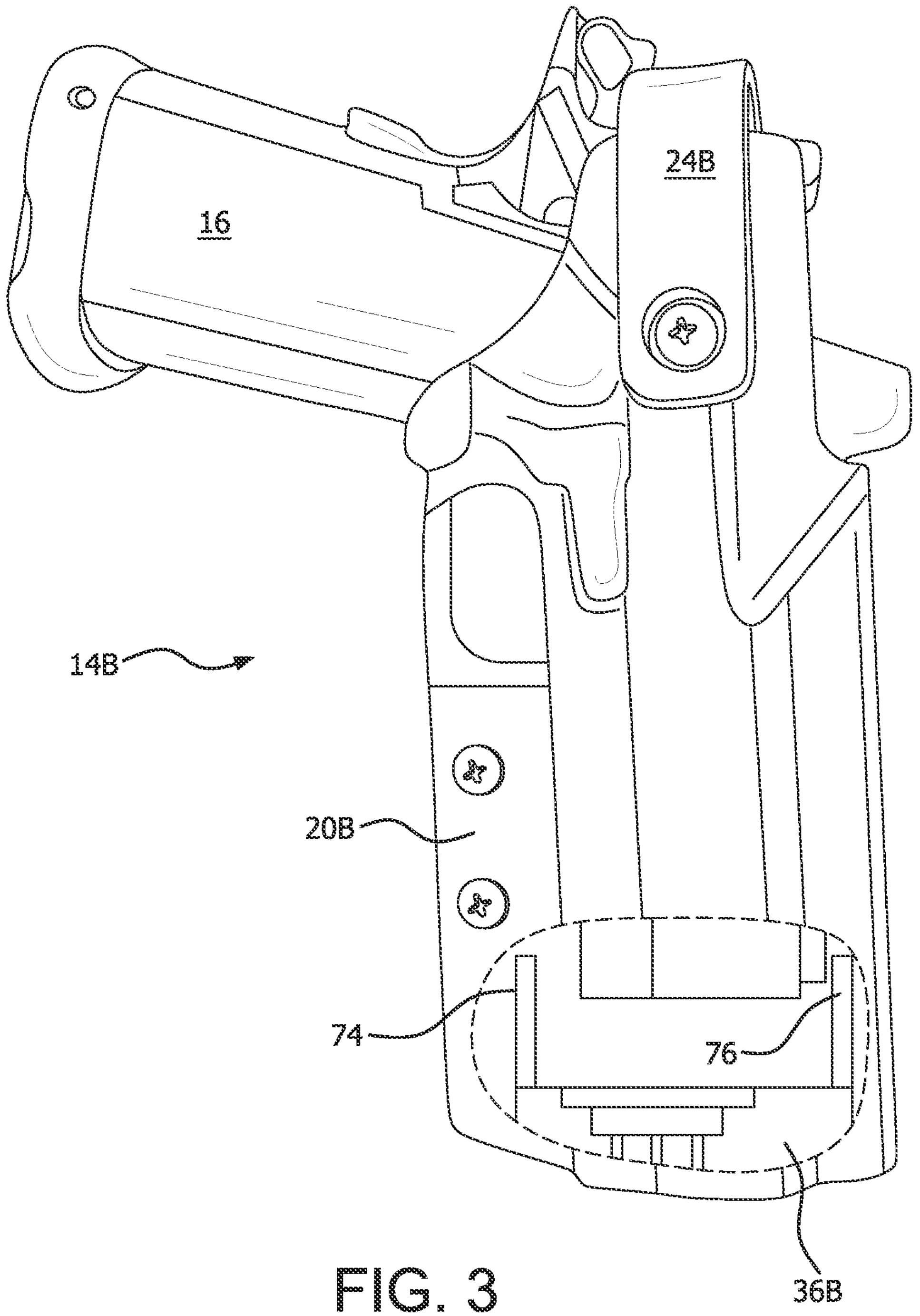
FIG. 3 is a partially cutaway side elevational view of yet another example of a holster of the present invention.
Figure 4:
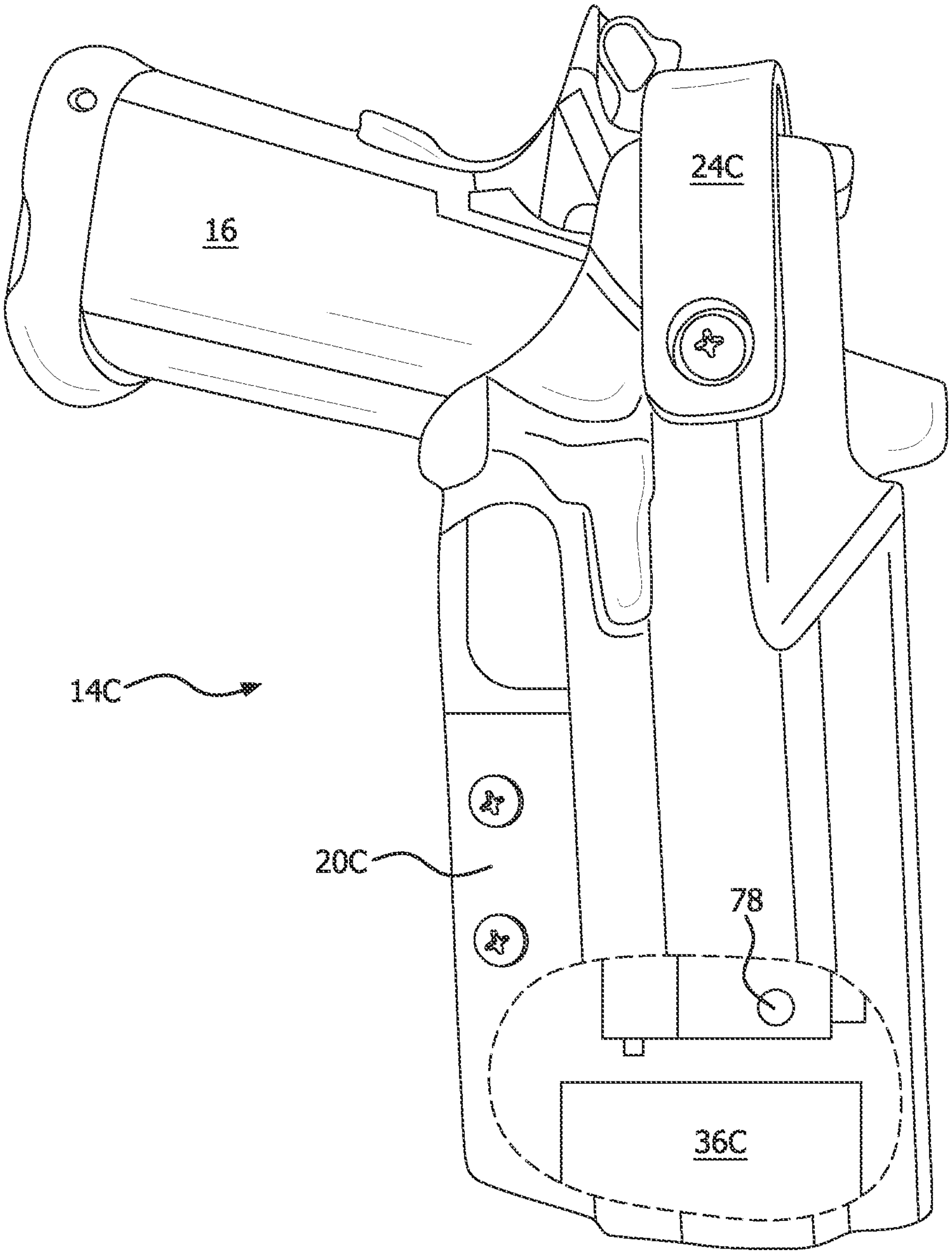
FIG. 4 is a partially cutaway side elevational view of a further example of a holster of the present invention.

Referring to the drawings, there is shown a weapon differentiation notification system 8 for a holster 10 (FIG. 1) for less-than-lethal device, which in the illustrated example is an electro-muscular disruption device or EMD 12. Additionally, the weapon differentiation notification system 8 is also shown with a holster 14 (FIGS. 2-4) for a lethal weapon, which in the illustrated example is a firearm 16. As used herein, the reference character 14A refers to the holster of FIG. 2, 14B refers to the holster of FIG. 3, 14C refers to the holster of FIGS. 4, and 14 (without a letter) refers to any of the holsters of FIGS. 2-4. The same convention is used for other reference characters within FIGS. 2-4. The holster 10 and holster 14 differ primarily in the weapon they are designed to carry, and the audible and/or visual alert they are structured to provide upon drawing the weapon. As used herein, "holster" includes not only holsters, but also any pouch or other container or device for removably securing equipment to a wearer. "Holster" may thus include, for example, a pouch for holding pepper spray, a holder for a baton or nightstick, and the like. As used herein, "weapon" refers to EMDs, stun guns, firearms, pepper spray, batons, night sticks, and any other presently available or later developed device which may be carried on a user's body and utilized for self-defense or to obtain compliance or apply proper use of force. In the event the "holster" contains pepper spray, the system could audibly and or visually announce, "Spray, Spray, Spray".

Although the illustrated example of a holster 10, 14 is an outside the waistband holster designed to be worn on the hip, the invention may be used in connection with a strong side hip holster, a cross draw holster, an inside the waistband holster, an appendix inside the waistband holster, a chest holster, a shoulder holster, a thigh holster, an ankle holster, a pocket holster, or the like without departing from the invention. The illustrated examples of holsters 10, 14 each include a holster body 18, 20, respectively, into which a firearm 16 or EMD device 12 (which in the illustrated example is an EMD device sold under the trademark TASER) may be inserted and secured. In the illustrated examples, a retention strap 22, 24 extends upward from the body 18, 20 for securing around the uppermost portion of an EMD device 12 or firearm 16. Other holster bodies 18, 20 may include various latching mechanisms to retain the weapon or to resist drawing the firearm by unauthorized individuals, and/or passive retention such as molding the holster body 18,20 sufficiently closely to the shape of the firearm 16 or EMD device 12 to retain the firearm 16 or EMD device 12 within the holster. The illustrated example of a holster 10, 14 also includes a body attachment for securing to a belt, a shoulder harness, or other presently known or later developed system for securing the holster 10, 14 to a wearer. In the illustrated example, the body attachment is a belt attachment, for example, a belt loop permits passage of a belt 30 therethrough to secure the holster 10. 14 to the wearer in a manner which is not shown but which is well-known to those skilled in the art of shooting. Other examples of the holster 10, 14 may use belt clips, J-hooks, shoulder harnesses, thigh straps, ankle straps, or the like.

Figure 5:
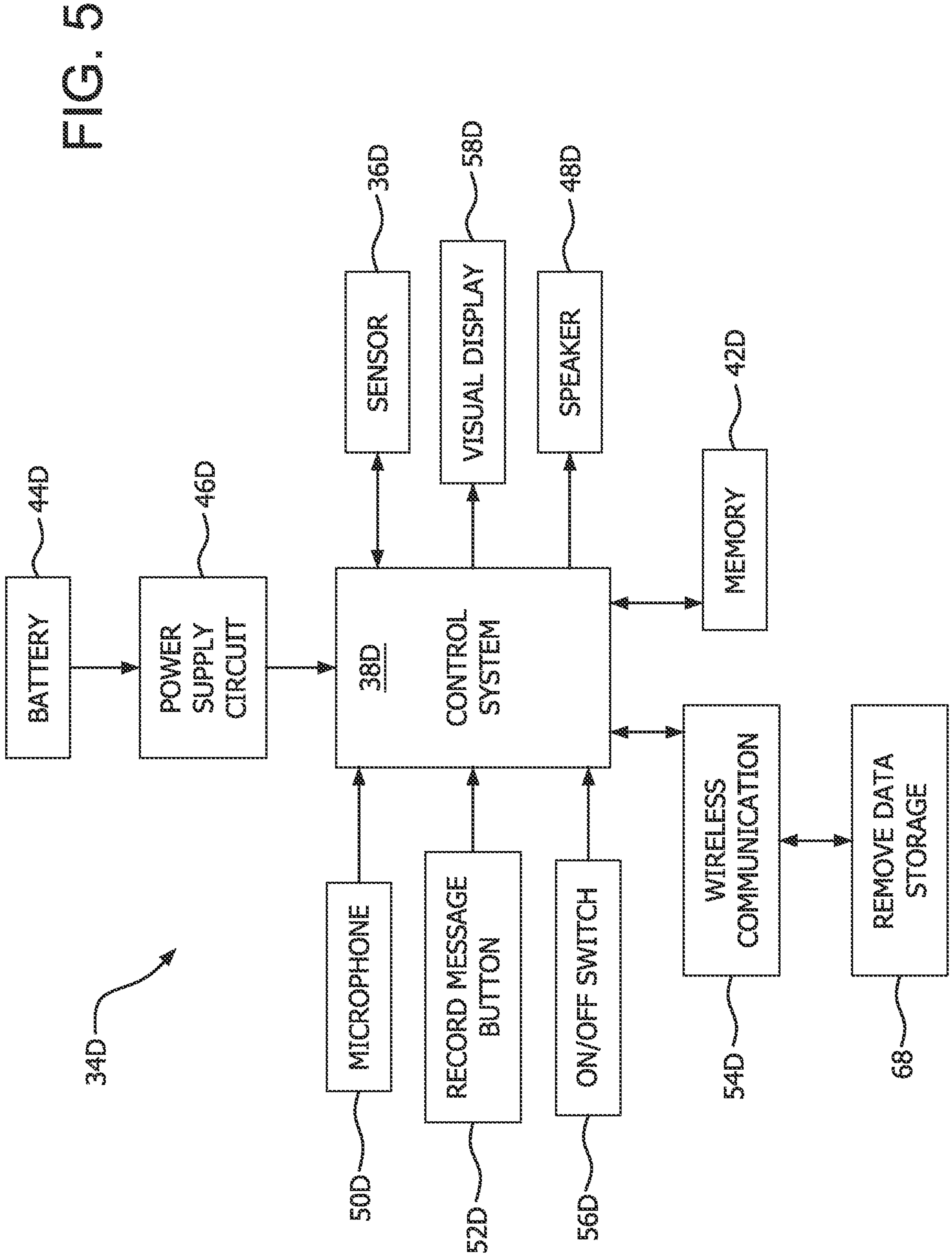
FIG. 5 is a schematic diagram of an example of the electronic components of a holster of the present invention.
Figure 6:
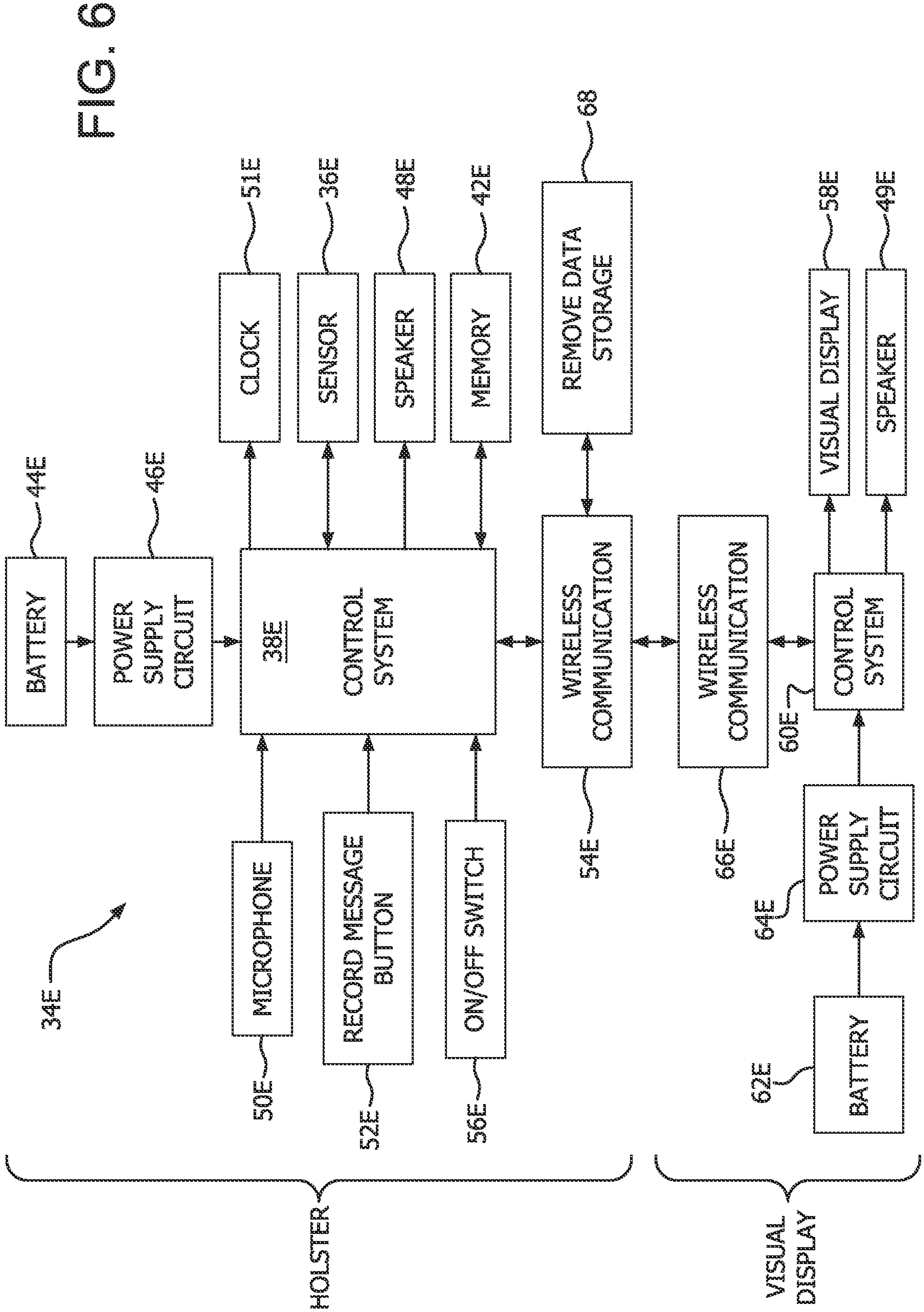
FIG. 6 is a schematic diagram of another example of the electronic components of a holster of the present invention.
Figure 7:
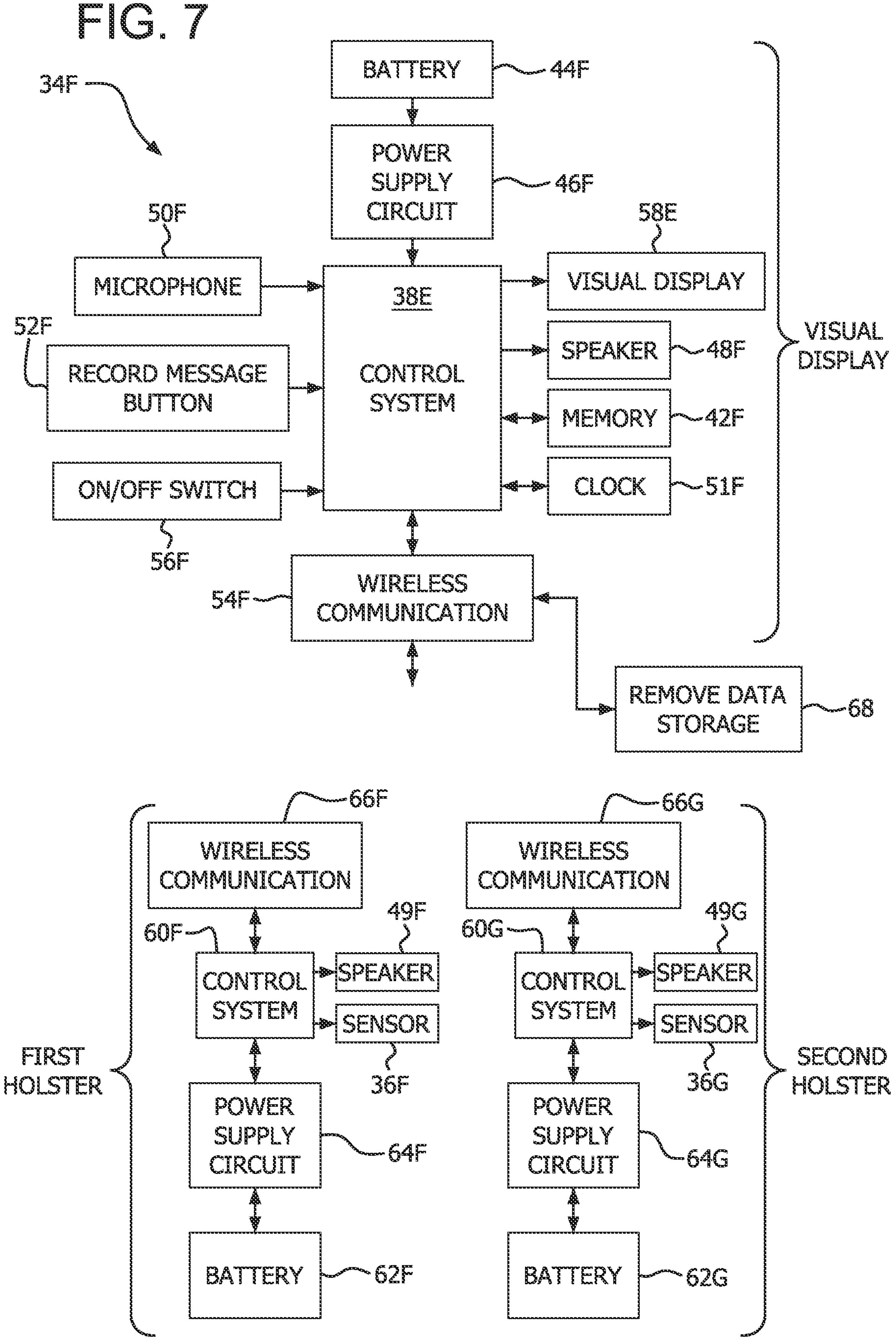
FIG. 7 is a schematic diagram of yet another example of the electronic components of a holster of the present invention.

Referring to FIGS. 5-7, the holster 10, 14 includes an audible and/or visual notification system 34 for providing an audible and/or visual notification when the EMD device 12 or firearm 16 is drawn from the holster. As used herein, a reference character by itself refers to that component in any of FIGS. 5-7, A reference character followed by a D refers to the example of FIG. 5, a reference character followed by an E refers to the example of FIG. 6, and a reference character followed by an F or G refers to the example of FIG. 7. The audible and/or visual notification system 34 includes a sensor 36 for detecting the presence or absence of an EMD device 12, firearm 16, or other weapon from the holster 10, 14. As used herein, sensor is defined as including any device which provides a signal in response to the presence or absence of the lethal or less than lethal weapon from the holster, including any suitable electronic sensor, mechanical switches, and the like. Some examples of the sensor 36 can be a pressure sensor such as an ultrasonic flow sensor, potentiometric sensor, piezoelectric sensor, strain gauge, and variable reluctance sensor. In other examples, the sensor can be a Hall effect sensor. inductive sensor which detects eddy currents, a capacitive sensor, a laser sensor, a confocal sensor, an interferometer to measure white light, an LVDT inductive sensor, a magneto-inductive sensor, a potentiometer based position sensor, a pulse encoding sensor, a photoelectric sensor, a vision sensor or optical linear sensor, a proximity sensor, a photo micro sensor, an infrared detector, or an occupancy light sensor. Some sensors may utilize a detection element 78 attached to the EMD device 12 or firearm 16, for example, a small magnet or other detection element which is detected by the sensor when in proximity to the sensor.

Three examples of sensors 36 are illustrated. The holster 14A of FIG. 2 utilizes a normally closed switch 36A having an arm 70 which is pushed towards the housing 72 when the firearm 16 is in the holster 14A, opening the switch 36A. Removal of the firearm 16 removes the pressure from the arm 70, closing the switch 36A and providing a signal to the control system 38. The illustrated example of a switch 36A is a TAISS momentary micro limit switch. The holster 14B of FIG. 3 includes an infrared optocoupler 36B, which detects the presence of the firearm 16 through interruption of the infrared beam between the emitter 74 and the detector 76, and indicates that the firearm 16 was drawn when the detector 76 detects the beam. The holster 14C of FIG. 4 includes a Hall effect sensor 36C, which detects the presence or absence of the firearm 16 through changes in the magnetic field detected by the sensor. A small magnet 78 may be attached to the lethal or less than lethal weapon. When the magnet 78 comes into proximity with the sensor 36C, the presence of the weapon is detected. When the magnet 78 is moved away from the sensor 36C, the sensor 36C provides a signal to the control system 38 indicating that the weapon has been drawn.

Other sensors are disclosed in the references which are discussed in the background information above, and the entire disclosure of each and every one of those references is expressly incorporated herein by reference. The signal from the sensor 36 is provided to the controller 38, which utilizes the signal to determine the presence or absence of an EMD device 12, firearm 16, or other device within the holster 10, 14. The controller 38 also provides power for the sensor 36.

Referring back to FIGS. 5-7, any of the control systems 38 can be a general-purpose programmable microcontroller, a programmable logic device such as field programmable gate array, an application specific integrated circuit, a custom integrated circuit, or a custom non-integrated circuit. Some examples of the control system 38 will include or be connected to memory 42 containing executable instructions for performing the various functions described herein. Power is supplied by a battery 44. A power supply circuit 46, which is well known to those skilled in the art, is either incorporated into or connected to the control system 38, providing a conduit for power from the battery 44 to the control system 38. Depending on the type of battery selected, the power supply circuit 46 may also include battery protection components which are well known to those skilled in the art.

Referring to FIGS. 5-8, some examples of the system include a speaker 48 connected to the controller 38. Other examples include a visual display 58. The visual display 58D of FIG. 5 is connected to the control system 38D. In the example of FIG. 5, all components are either part of the holster 10, 14, or are physically connected with appropriate wiring even if placed elsewhere on the officer's body. The visual display 58E of FIG. 6 includes its own control system 60E, with its own battery 62E and power supply circuit 64E, which communicates wirelessly with the control system 38E using the wireless communication system 66E. The wireless communication systems of FIGS. 5-7 may utilize any presently known or later developed wireless communication protocol, for example, near field communication (NFC), BLUETOOTH, Wi-Fi, and others. The example of FIG. 7 includes a controller 38F located on the base 80 of the visual display 58. The controller 38F also connects to the speaker 48F, memory 42F, microphone 50F, record message button 52F, and on/off switch 56F. This system 34F is useful for utilizing a plurality of holsters 10, 14 with a single visual display 58 and/or speaker 48F. Each holster 10, 14 includes a sensor 36F, 36G having its own control system 60F, 36G with its own battery 62F, 62G and power supply circuit 64F, 64G which communicates wirelessly with the control system 60F 60G.

Referring to FIGS. 6-7, some examples utilizing remote output devices may include two speakers: a speaker 49E, 48F which is remote from the holster 10, 14 and a speaker 48E, 49F which forms a part of the holster 10, 14. In the illustrated example of such systems, the speaker 49F, 48E is the primary speaker. However, if communication between the holster 10, 14 and remote speaker 49E, 48F, then the speaker 48E, 49F will be utilized. This redundant capability ensures that even if the combined audible/visual notification provided by the speakers 49E, 48F and visual displays 58 is not provided due to a lost connection, a backup audible notification will be provided.

Figure 8:
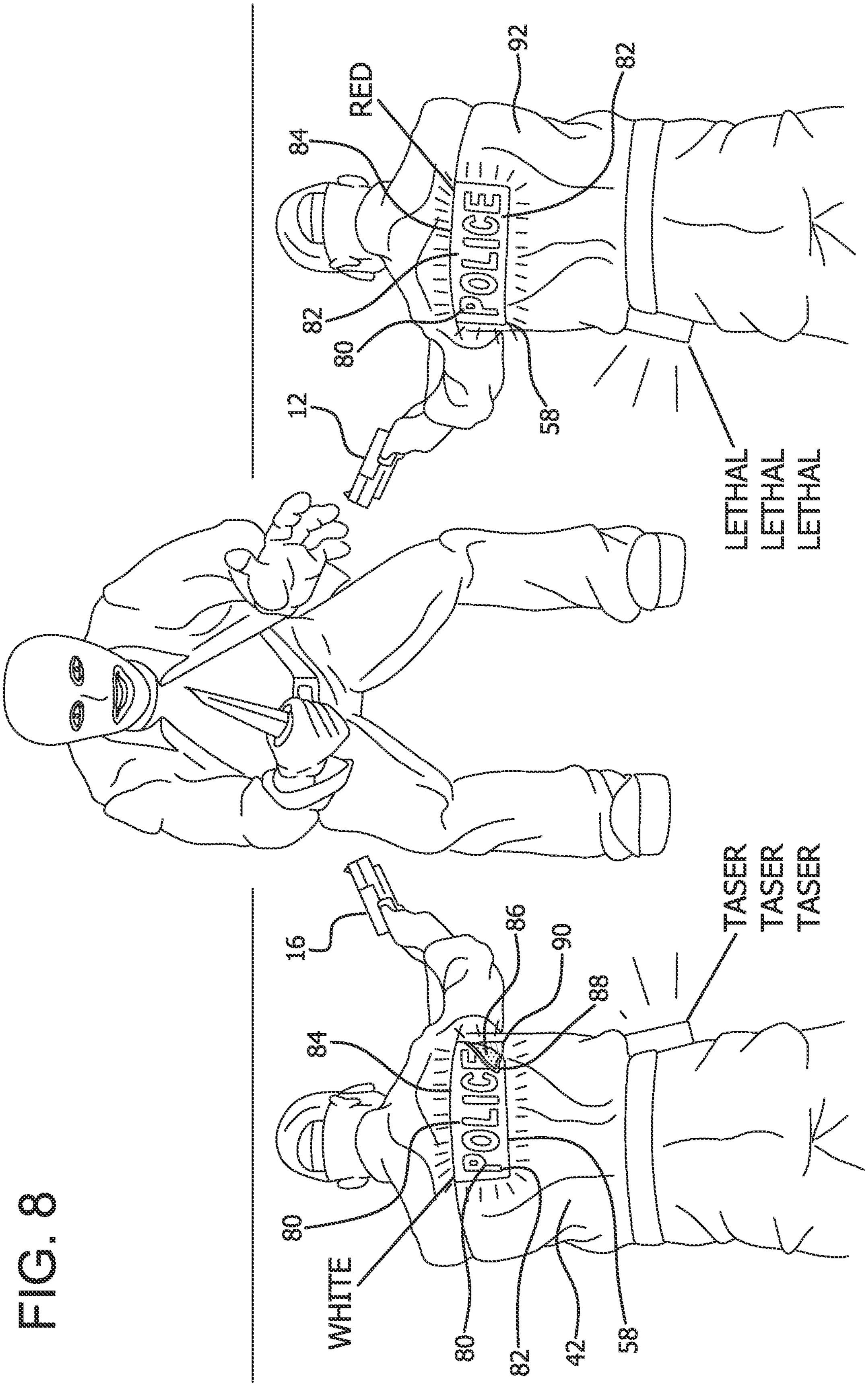
FIG. 8 is an environmental, perspective view of the system of the present invention, showing the system in use for both a lethal weapon and a less lethal weapon.

As shown in FIG. 8, the illustrated example of a visual display includes one or more light emitters 80, which in the illustrated example are arranged to display the word "Police" or other identifying word. The light emitters 80 are arranged on the front surface 82 of a base 84, which in the illustrated example is a removable fabric patch having attachment structures 86, for example, either the hook or the loop component of hook and loop fasteners disposed on the back surface 88, to attach to the other hook and loop component 90 on the back 92 of the officer's uniform or body armor. The light emitters 80 may be a series of light emitting diodes, fiber optic emitters, and the like. Some examples may include at least one light emitter 80 having a first color, for example, white, and at least one second light emitter 80 having a second color, for example, red, so that the white light emitter(s) 80 can be illuminated if a less lethal weapon 12 is drawn, and the red light emitters 80 may be illuminated if a lethal weapon 14 is drawn. Other examples may include light emitters which are capable of emitting more than one color, for example, and LED which is capable of emitting more than one color. Some examples of the system 34 may thus include both a holster 10 and a holster 14 which are operatively connected to the same visual display 58. In these examples, a signal from the control system 38 for the holster 10 will cause the visual display 58 to illuminate the first color light emitters 80, and a signal from the control system 38 of the holster 14 will cause the visual display 58 to illuminate the second color light emitters. Similarly, the same speaker 48 may be operatively connected to both a holster 10 and a holster 14, so that when a weapon is drawn from one of the holster 10 or holster 14, the appropriate audible notification is output by the speaker 48.

In examples including a speaker 48, when an EMD device 12, firearm 16, or other weapon is removed from the holster 10, 14, a signal is sent to the speaker 48 to deliver a predetermined message. Some examples of the predetermined message will include either the level of force for which the weapon is used (for example, lethal) or the type of weapon, (for example, TASER or OC, which is known as an abbreviation for oleoresin *capsicum*, the active ingredient in pepper spray). Depending on the weapon which has been removed, the predetermined message could be, for example, "TASER, TASER, TASER!", "Lethal weapon, lethal weapon, lethal weapon!", "OC. OC, OC!", or the like.

In examples which include a visual display 58, when an EMD device 12, firearm 16, or other weapon is removed from the holster 10, 14, a signal is sent to the display 58 to illuminate the display. Some examples may cause the display 58 to emit white light to display the word "Police" or other identifying indicia in the event that an EMD device, pepper spray, or other less lethal weapon is drawn. Other examples may cause the display 58 to emit red light to display the word "Police" or other identifying indicia in the event that a lethal weapon such as a firearm is drawn. Officers or supervisors arriving after weapons have been drawn will immediately be able to perceive which officers have deployed which type of weapon, enabling them to more rapidly assess the situation and determine which additional actions may be required. Some examples include both a speaker 48 and visual display 58, providing immediate audible communication differentiating the weapons being drawn to the suspect and the officers who are present, and providing continuous visual differentiation of the weapons which have been drawn to other officers and supervisors.

In a system 34F of FIG. 7 in which both a holster 10 and a holster 14 may be included within the system, it is possible that both weapons 12, 16 will be removed from their holster 10, 14 simultaneously. This can occur, for example, if an officer initially believes that less lethal force is appropriate, and drops an EMD device 12 or other less lethal weapon while struggling with a suspect. In such a situation, the officer may find it necessary to draw the firearm 16. The audible notification will be provided at the time each weapon is drawn, but the visual notification must now address the fact that two weapons have been drawn. Some examples of the system 34F may prioritize the visual notification of the lethal weapon being drawn, displaying only the visual notification of the lethal weapon if both a lethal and less lethal weapon have been drawn. Other examples of the system 34F may provide a third visual notification indicating that both weapons have been drawn, for example, by illuminating a different color.

The predetermined audio message may be selected and/or recorded in a variety of ways. As one example, the control system 38 may be pre-programmed with the desired message. As another example, the control system 38 may include the capability of recording a message. A microphone 50 may be connected to the control system 38 for receiving a spoken message upon a user pressing a record message button 52. Yet another example of the control system 38 may include or be connected to a wireless communication module 54 for connecting to a smart phone, tablet computer, smart watch, or the like which includes a software application or "app" that is structured to facilitate programming the control system 38. The wireless communication module 54 may utilize any presently known or later developed wireless communication protocol, for example, near field communication (NFC), BLUETOOTH, Wi-Fi, and others. Such systems may also utilize the speaker or any visual displays or illumination devices which may be present on a smart watch, smart phone, or the like having the appropriate "app" and which is in wireless communication with the control system 38, so that audible and/or visual notifications may be delivered using the smart phone, smart watch, or the like.

Some examples of the holster 10, 14 may include an on/off switch 56 connected to the control system 38 to the speaker 36, or to the visual display 58 so that the audible and/or visual warning may be deactivated at times when silence and/or surreptitious approaches are desired.

Some examples of the system 34 also communicate with a remote data storage system 68, so that the times at which a weapon is removed from a holster 10, 14 are recorded remotely. The times at which a weapon is returned to the holster 10, 14 are also recorded remotely. Some examples may include a clock 51E, 51F (FIGS. 6 and 7) so that time-stamped records of removal and replacement of a weapon may be recorded and stored either locally in memory 42D. 42E, 42F (FIGS. 5-7) and/or remotely in the remote storage system 68.

In use, the EMD device 12, firearm 16, or other weapon is placed into the holster 10, 14 having the desired audible notification recorded (for systems which include an audible notification) for use by the control system 38. The sensor 36 detects the presence of the EMD device 12, firearm 16, or other weapon, and sends the appropriate signal to the controller 38. The on/off switch 56 is set to the desired position depending on the anticipated tasks of the user. If the on/off switch is set to on, and the user is required to draw the EMD device 12, firearm 16, or other weapon, then the sensor 36 will detect the absence of the EMD device 12, firearm 16, or other weapon, and send the appropriate signal to the controller 38. The controller 38 will then send the appropriate signals to the speaker 48 and visual display 58 to provide the predetermined audible and/or visual notification. If the user is, for example, a police officer acting with other police officers, the other police officers will be aware of the actions being taken, and will then be able to act accordingly themselves. If a mistake is being made, the user and others will be alerted to the mistake, and will then have an opportunity to prevent that mistake from being carried out to the point of creating a negative outcome. The visual display 58 (if present) will display an indication which differentiates a lethal weapon from a less lethal weapon, for example, by the color with which "Police" is illuminated by the light emitters 80 for the entire time that the weapon is out of the holster 10, 14, allowing later-arriving officers or supervisors to quickly and correctly assess the situation. Some examples of the visual display 58 may accomplish this by including at least one light emitter 60 in a first color, for example, white, and other light emitters 80 in a second color, for example, red. Once the EMD device 12, firearm 16, or other weapon is returned to the holster 10, 14, the sensor 36 will detect the presence of the EMD device 12, firearm 16, or other weapon within the holster 10, 14, and will send the appropriate signal to the controller 38.

The present invention therefore provides a system which provides an audible and/or visual notification differentiating a lethal weapon from a less lethal weapon when an officer must remove a weapon from its holster or pouch. The audible and/or visual notification identifies the type of weapon or device which has been withdrawn, alerting others who may be working cooperatively with the user so that they can take appropriate actions. The user and others are also notified of the specific weapon or device which is being drawn, providing an opportunity to recognize if a mistake has been made prior to the occurrence of any negative outcomes. Later-arriving officers or supervisors can quickly assess the situation by viewing the information provided by any visual notification provided by the system. Notifications may be turned on or off as determined by the user, permitting surreptitious approaches when such an approach is appropriate.

Although the weapon differentiation notification system is anticipated to be used to differentiate lethal weapons, for example, firearms, from less lethal weapons, for example, EMD devices, the system could be used to distinguish two different lethal weapons or two different less lethal weapons without departing from the invention. For example, an EMD device, a chemical irritant, or a nightstick may all be regarded as having differing levels of force, even if all of these differing levels of force fall within the range of less lethal force. Similarly, different lethal weapons may be distinguished from each other. For example, notification of an officer deploying a shoulder-fired weapon such as a rifle or shotgun would indicate to other officers present or later-arriving officers that one officer perceives a heightened threat.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A weapon differentiation notification system, comprising:

a first holster body, the first holster body being structured to hold a first weapon within the first holster body, the first weapon being of a type of weapon and having a level of force for which the first weapon is used;

a second holster body, the second holster body being structured to hold a second weapon within the second holster body, the second weapon being of a type of weapon which is different from the type of weapon of the first weapon, and the second weapon has a level of force for which the second weapon is used, and which is different from the level of force for which the first weapon is used;

a control system;

a first sensor disposed within the first holster body, the first sensor being operatively connected to the control system;

a second sensor disposed within the second holster body, the second sensor being operatively connected to the control system;

a first output device, the first output device being structured to provide an audible notification or a visual notification, the first output device being operatively connected to the control system;

the control system being structured to receive a signal from the first sensor and to determine whether the first weapon is within the first holster body based on the signal from the first sensor;

the control system being further structured to receive a signal from the second sensor and to determine whether the second weapon is within the second holster body based on the signal from the second sensor;

the control system is further structured to, in the event that the signal from the first sensor changes from an indication of the first weapon being within the first holster body to the first weapon being absent from the first holster body, provide a signal to the first output device causing the first output device to output a first audible notification or a first visual notification, the first audible notification or first visual notification specifying either the level of force for which the first weapon is used or the type of weapon corresponding to the first weapon; and the control system is further structured to, in the event that the signal from the second sensor changes from an indication of the second weapon being within the second holster body to the second weapon being absent from the second holster body, provide a signal to the first output device causing the first output device to output a second audible notification or a second visual notification, the second audible notification or second visual notification specifying either the level of force for which the second weapon is used or the type of weapon corresponding to the second weapon.

2. The weapon differentiation notification system according to claim 1:

further comprising a second output device;

wherein the control system is further structured to, in the event that the signal from the first sensor changes from an indication of the first weapon being within the first holster body to the first weapon being absent from the first holster body, provide a signal to the first output device causing the first output device to output a first audible notification and to provide a signal to the second output device causing the second output device to output a first visual notification, the first audible notification and first visual notification specifying either the level of force for which the first weapon is used or the type of first weapon; and wherein the control system is further structured to, in the event that the signal from the second sensor changes from an indication of the second weapon being within the second holster body to the second weapon being absent from the second holster body, provide a signal to the first output device causing the first output device to output a second audible notification and to provide a signal to the second output device causing the second output device to output a second visual notification, the second audible notification and second visual notification specifying either the level of force for which the second weapon is used or the type of second weapon.

3. The weapon differentiation notification system according to claim 2, wherein the first output device is a speaker.

4. The weapon differentiation notification system according to claim 2, wherein:

the second output device is structured to selectively emit light having a first color and light having a second color;

the control system is structured to emit light having the first color in response to a signal from the first sensor corresponding to removal of the first weapon from the first holster; and the control system is structured to emit light having the second color in response to a signal from the second sensor corresponding to removal of the second weapon from the second holster.

5. The weapon differentiation notification system according to claim 1, wherein the first output device is a speaker.

6. The weapon differentiation notification system according to claim 1, wherein:

the first output device is structured to selectively emit light having a first color and light having a second color;

the control system is structured to emit light having a first color in response to a signal from the sensor corresponding to removal of the first weapon from the first holster; and the control system is further structured to emit light having a second color having the second color in response to a signal from the second sensor corresponding to removal of the second weapon from the second holster.

* * * * *